United States Patent [19]

Loken

[11] 4,226,095
[45] Oct. 7, 1980

[54] MECHANISM FOR MAINTAINING CONTACT BETWEEN THE DRIVING SIDE OF TORQUE TRANSFERING SURFACES OF A FIRST ROTATABLE MEMBER AND THE DRIVEN SIDE OF MATCHING TORQUE TRANSFERING SURFACES OF A SECOND ROTATABLE MEMBER

[75] Inventor: Philip I. Loken, Savage, Minn.

[73] Assignee: Horton Manufacturing Company, Inc., Minneapolis, Minn.

[21] Appl. No.: 952,659

[22] Filed: Oct. 19, 1978

Related U.S. Application Data

[63] Continuation of Ser. No. 802,378, Jun. 2, 1977, abandoned.

[51] Int. Cl.³ ............................................. F16D 3/14
[52] U.S. Cl. ............................. 64/27 CT; 192/70.2
[58] Field of Search ..................... 64/27 C, 27 CT; 192/70.2, 70.19, 70.17

[56] References Cited

U.S. PATENT DOCUMENTS

| | | | |
|---|---|---|---|
| 1,431,401 | 10/1922 | Hupp | 64/27 CT |
| 1,518,604 | 12/1924 | Rosner | 192/70.2 |
| 1,884,029 | 10/1932 | Luyks | 64/27 CT |
| 2,332,859 | 10/1943 | Kreissig | 64/27 CT |
| 2,336,307 | 12/1943 | Slye | 64/27 CT |
| 2,936,625 | 5/1960 | Heiseler | 64/27 CT |
| 3,770,087 | 11/1973 | Jaeschke | 64/27 CT |
| 4,016,962 | 4/1977 | Black | 192/70.2 |

Primary Examiner—Ira S. Lazarus
Assistant Examiner—Magdalen Moy
Attorney, Agent, or Firm—Wicks & Nemer

[57] ABSTRACT

A mechanism for maintaining contact between the driving side of spline teeth of a first rotatable member against the driven side of matching spline teeth of a second rotatable member including a coil spring carried by the rotatable second member. One end of the spring has a first tang formed thereon which engages in a hole formed in the first rotatable member and a second tang formed on the other end of said spring engaged in a hole formed in a washer having teeth formed on the inner edge thereof engaged with the splines of the second rotatable member when the washer is rotated relative to the second rotatable member one or more splines of the second rotatable member from static condition of the spring thereby torsionally loading the spring. The spring is compressed longitudinally of the second rotatable member as it is loaded and the spring is secured in place upon the second rotatable member by means of a lock ring in engagement with a circumferential groove formed in the splines of the second rotatable member.

3 Claims, 2 Drawing Figures

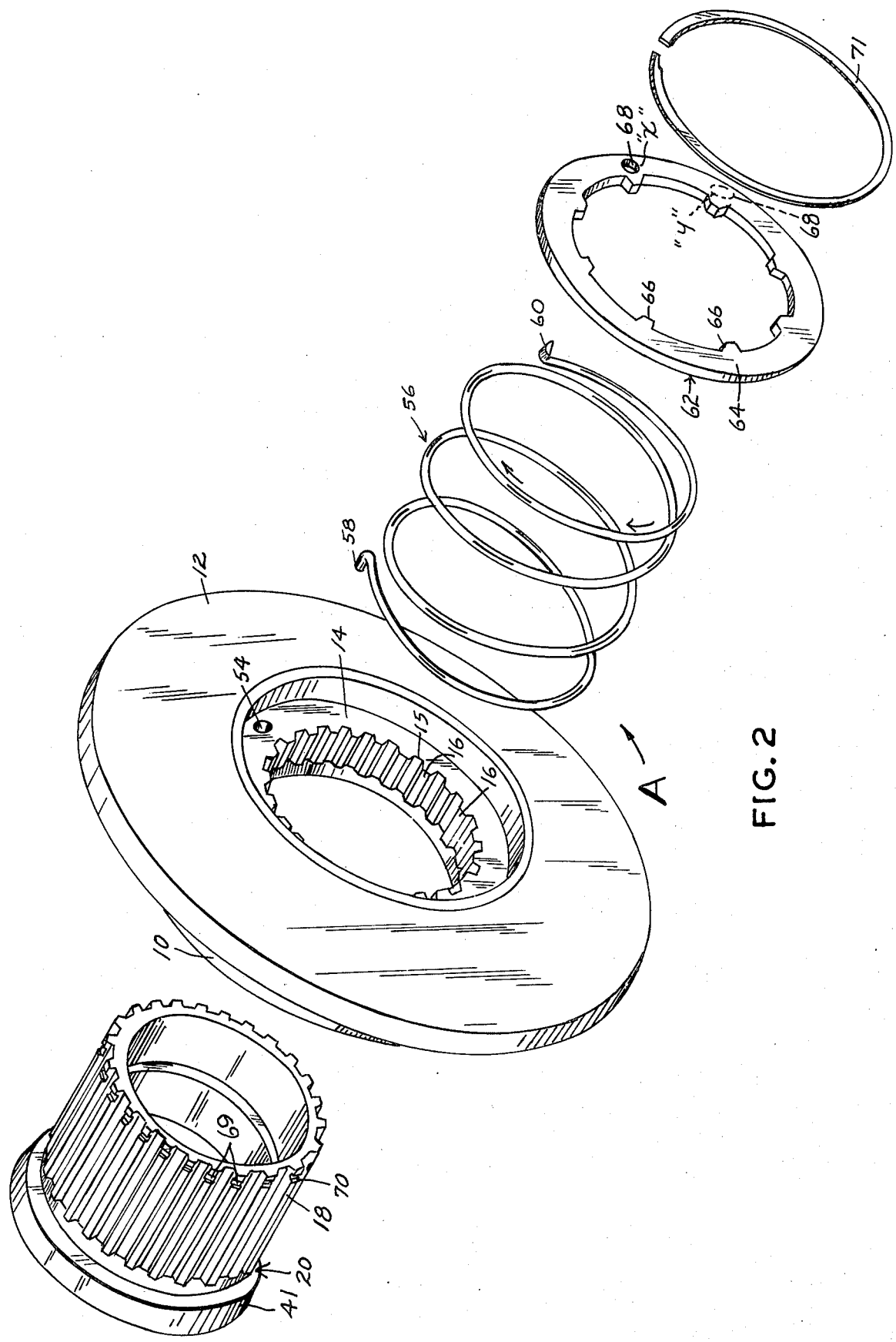

MECHANISM FOR MAINTAINING CONTACT BETWEEN THE DRIVING SIDE OF TORQUE TRANSFERING SURFACES OF A FIRST ROTATABLE MEMBER AND THE DRIVEN SIDE OF MATCHING TORQUE TRANSFERING SURFACES OF A SECOND ROTATABLE MEMBER

CROSS REFERENCE

This is a continuation of application Ser. No. 802,378, filed June 2, 1977, now abandoned.

SUMMARY

The invention relates broadly to devices such as clutches and brakes wherein is found a splined or pinned rotatable driving member which drives a splined or pinned rotatable driven member. The degree of sliding clearances between the splines or pins varies, and in many installations, additional clearance occurs due to wear which accellerates further wear. With clearance present, either by design or wear, noise results from backlash caused by torsional vibrations in the power source. As the wear clearance advances, greater noise results. The present invention substantially cures the above referred to noise occurring within the original clearance and substantially arrests the progression of wear, thereby maintaining noise suppression, by providing a mechanism which maintains contact between the driving side of spline teeth or pins of a rotatable driving member and the driven side of spline teeth or pins of a rotatable driven member as described hereinafter.

The invention will appear more clearly from the following detailed description when taken in connection with the accompanying drawings, showing by way of example a preferred embodiment of the inventive idea wherein like numerals refer to like parts throughout.

In the drawings forming part of this application:

FIG. 2 is an exploded perspective view showing a splined hub, piston friction disc having internal splines, a coil spring, an internally splined washer and a lock ring.

Figure 1:
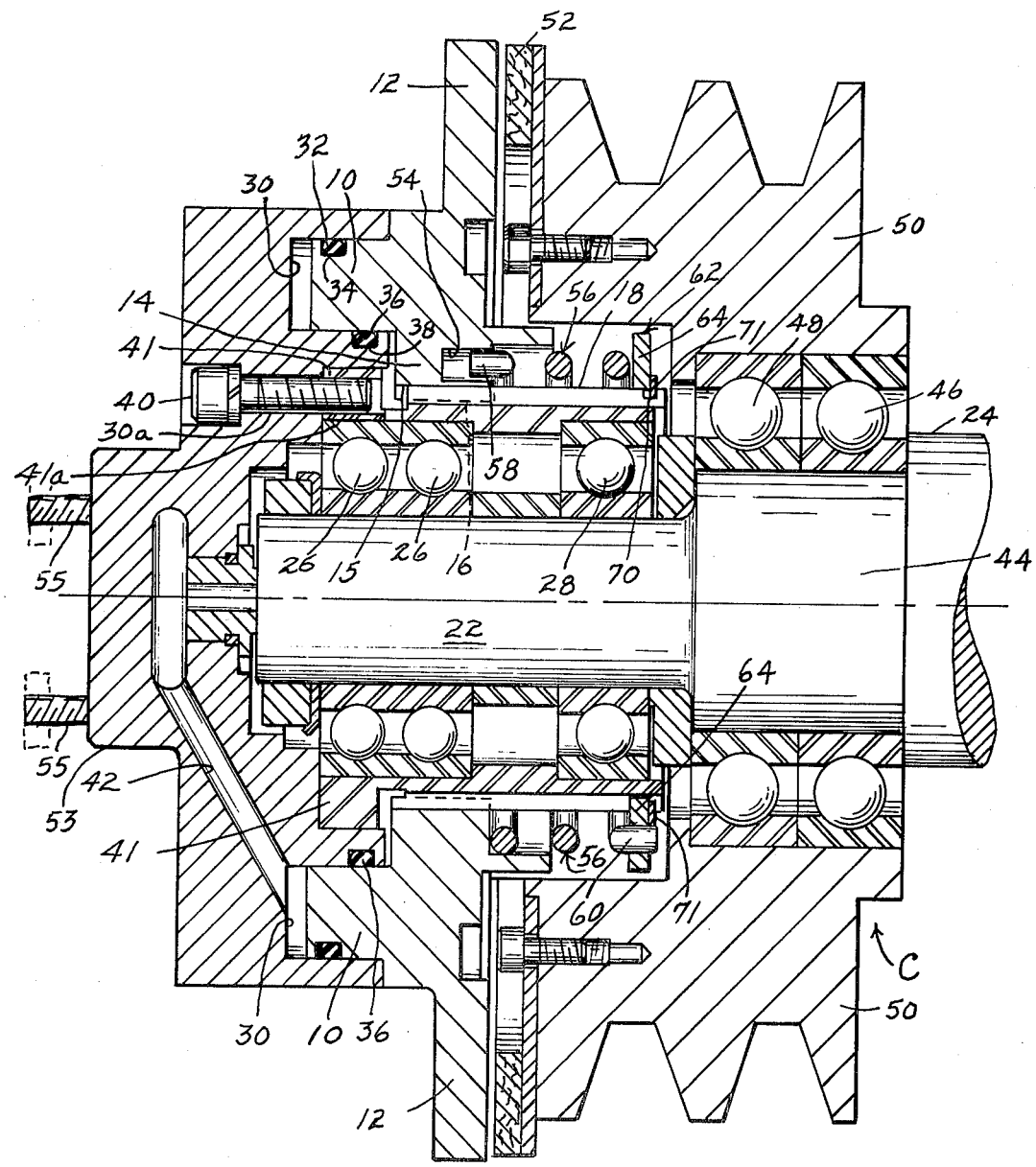
FIG. 1 is a sectional view of an air operated clutch having the apparatus for maintaining contact between the driving side of a spline tooth against the driven side of a matching spline embodying the invention.

Referring to the drawings in detail, the mechanism A for maintaining contact between the driving side of a torque transmitting surface such as a spline tooth against the driven side of a matching torque transmitting surface such as a spline tooth is illustrated in position in a clutch shown in axial section in FIG. 1. The clutch C includes a first and driving member in the form of an annular piston 10 which has formed thereon the annular friction disc portion 12 and the internal annular base portion 14. Formed internally of the axial hole 15 of the annular base portion 14 are the torque transmitting surfaces in the form of internal splines 16 which engage with the external torque transmitting surfaces in the form of splines 18 of a second and driven member in the form of the hub 20. The hub 20 is rotatably mounted on the reduced outward end 22 of shaft 24 by means of the bearings 26 and 28.

The numeral 30 designates an annular cylinder block in which is mounted the annular piston 10 with sealing engagement by means of the O-ring 32 mounted in the annular groove 34 formed in the piston and the O-ring 36 mounted in the annular groove 38 formed in the cylinder 30. The cylinder 30 is secured to the hub 20 by means of a multiplicity of spaced bolts 40 which extend through clearance holes 30a in the cylinder block 30 and engage threaded holes 41a in collar 41. Air pressure is introduced into cylinder 30 by conventional conduit means 42.

Mounted on the reduced portion 44 of the shaft 24 are the bearings 46 and 48 which rotatably mount the sheave 50 on which is mounted the friction facing ring 52. The facing 52 is engaged by the friction disc portion 12 of the piston 10 when air pressure is introduced into cylinder 30 thereby clutching in the friction disc portion 12, the hub 20 and the cylinder block 30 on which a fan (not shown) may be mounted on the pilot extension 53 and secured by means of nut-equipped studs 55 on the cylinder block 30.

The base portion 14 of the piston 10 is formed with the hole 54. Further provided is the compression coil spring 56 which has formed on one end thereof the axially extending tang 58 and on the other end the axially extending tang 60. The numeral 62 designates a splined washer having the flat ring-like body 64. The ring-like body 64 has formed on the inner edge thereof the splines 66 and formed in the body 64 is the hole 68 in which is engaged the tang 60 as hereinafter explained.

The hub 20 has formed therein adjacent the outer ends of the splines 18 the notches 70 in annular alignment forming a circumferential groove 69 in the splines and which receive the locking ring 71 as will be hereinafter explained.

ASSEMBLY AND OPERATION

The hub 20, piston and friction disc 12, spring 56, washer 62 and locking ring 71 are assembled as follows: The hub 20 is positioned within and extended from the hole 15 of the friction disc portion 12 with the splines 18 of the hub in engagement with the splines 16 of the disc portion 12. The spring 56 is then placed concentrically about the splines 18 of the hub with the tang 58 positioned in the hole 54 in the friction disc portion 12. The tang 60 is then positioned in the hole 68 of the washer 62. The washer 62 in its spring engaged position is then rotated against the direction of rotation of the clutch with expansion of the spring in the direction of the arrows in FIG. 2 to create a torsional pre-load on the spring whereby the tang 60 in hole 68 is moved substantially from the position "X" to that of "Y" on two splines on the hub, as an example, depending on the natural frequency of the system to be controlled. Then the splines 66 of washer 62 are engaged with the splines of the hub whereby the spring is held in a torsional pre-loaded condition. Next the washer is moved axially on the splines 18 thereby compressing the spring to a point inwardly of the notches 70. The locking ring 71 is then slipped into the groove 69 thereby anchoring the spring in compressed and torsionally pre-loaded condition. As a result spring-urged contact is maintained between the driving side of the splines 16 of the friction disc 12 and the driven side of the splines 18 of the hub 20.

Further, the coil spring 56 may be torsionally preloaded in a direction opposite to that hereinbefore described depending upon the direction of rotation of the input power transmitted by the sheave 50.

Having thus described the invention, what is claimed as new and desired to be secured by Letters Patent is:

1. A mechanism for maintaining contact between the driving side of the torque transmitting surfaces of a first rotatable member against the driven side of matching torque transmitting surfaces of a second rotatable member comprising:
   (a) said first rotatable member having an axial hole with internal splines on the surface thereof forming torque transmitting surfaces,
   (b) said second rotatable member having elongated splines extending axially on the outer surface thereof forming torque transmitting surfaces in engagement with said internal splines,
   (c) a helical coil spring encircling said splines on said second rotatable member,
   (d) means connecting one end of said coil spring to said first rotatable member,
   (e) a washer having teeth formed on the internal edge thereof engageable with the splines of said second rotatable member,
   (f) means connecting the other end of said coil spring to said washer,
   (g) means for preloading said spring including said washer freely rotated on said second rotatable member to torsionally load the spring for engagement of the teeth of the washer with the torque transmitting spline surfaces of said second rotatable member with the spring torsionally loaded.

2. The device of claim 1 in which said means connecting one end of said spring to said first rotatable member includes:
   (a) a tang formed on one end of the spring engageable in
   (b) a recess formed in said first rotatable member.

3. The device of claim 2 in which said means connecting the other end of said spring to said washer includes
   (a) a tang formed on the other end of the spring engageable in a recess formed in said washer.

* * * * *